United States Patent
Coles

(10) Patent No.: US 9,766,372 B2
(45) Date of Patent: Sep. 19, 2017

(54) CALIBRATION RESISTIVITY TOOLS IN ENVIRONMENTS WITH RADIO-FREQUENCY NOISE

(71) Applicant: Halliburton Energy Services, Inc., Houston, TX (US)

(72) Inventor: Randolph S. Coles, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 42 days.

(21) Appl. No.: 14/767,673

(22) PCT Filed: Mar. 13, 2013

(86) PCT No.: PCT/US2013/030939
§ 371 (c)(1),
(2) Date: Aug. 13, 2015

(87) PCT Pub. No.: WO2014/142840
PCT Pub. Date: Sep. 18, 2014

(65) Prior Publication Data
US 2016/0003971 A1  Jan. 7, 2016

(51) Int. Cl.
*G01V 13/00* (2006.01)
*G01V 3/26* (2006.01)
*G01V 3/28* (2006.01)

(52) U.S. Cl.
CPC .............. *G01V 13/00* (2013.01); *G01V 3/26* (2013.01); *G01V 3/28* (2013.01)

(58) Field of Classification Search
CPC ............. G01V 13/00; G01V 3/26; G01V 3/28
See application file for complete search history.

(56) References Cited

U.S. PATENT DOCUMENTS

| 5,001,675 A | 3/1991 | Woodward |
| 6,900,640 B2 | 5/2005 | Fanini et al. |
| 7,073,378 B2 | 7/2006 | Smits et al. |
| 7,093,672 B2 | 8/2006 | Sedoux et al. |
| 7,141,981 B2 | 11/2006 | Folberth et al. |

(Continued)

FOREIGN PATENT DOCUMENTS

| GB | 2392728 A | 3/2004 |
| WO | 2004/049010 A1 | 11/2010 |

OTHER PUBLICATIONS

Office Action issued in related Australian Application No. 2013382204, mailed Aug. 12, 2016 (4 pages).

(Continued)

*Primary Examiner* — Son Le
*Assistant Examiner* — Adam Clarke
(74) *Attorney, Agent, or Firm* — Benjamin Fite; Baker Botts L.L.P.

(57) ABSTRACT

Systems and methods for calibrating resistivity tools in environments with radio-frequency (RF) noise are described herein. The method may include receiving a first measurement from a resistivity tool. The measurement may be taken with the resistivity tool elevated to reduce ground effects on the measurements. The first measurement may be altered by excluding at least some RF noise from the first measurement. The RF noise may be a by product of the resistivity tool being elevated. Additionally, the resistivity tool may be calibrated using the altered first measurement.

16 Claims, 4 Drawing Sheets

(56) References Cited

U.S. PATENT DOCUMENTS

| | | | |
|---|---|---|---|
| 7,915,895 B2 | 3/2011 | Chemali et al. | |
| 2002/0153888 A1 | 10/2002 | Kruspe et al. | |
| 2004/0090234 A1* | 5/2004 | Macune | G01V 3/30 |
| | | | 324/337 |
| 2006/0017442 A1 | 1/2006 | Folberth et al. | |
| 2006/0017443 A1 | 1/2006 | Folberth et al. | |
| 2008/0215242 A1 | 9/2008 | Ramakrishnan | |
| 2012/0078558 A1 | 3/2012 | Pelegri et al. | |
| 2013/0043884 A1* | 2/2013 | Le | G01V 13/00 |
| | | | 324/601 |
| 2017/0052272 A1* | 2/2017 | Maeso | G01V 3/20 |

OTHER PUBLICATIONS

Examination Report issued in related Australian patent application No. 2013382204, mailed on Mar. 16, 2016 (4 pages).

International Search Report and Written Opinion issued in related PCT Application No. PCT/US2013/030939 mailed Nov. 22, 2013, 9 pages.

International Preliminary Report on Patentability issued in related PCT Application No. PCT/US2013/030939, mailed Sep. 24, 2015 (7 pages).

\* cited by examiner ately. This may be particularly problematic, for example, on offshore drilling rigs, which are typically made of metal that may affect the measurements more acutely.

CALIBRATION RESISTIVITY TOOLS IN ENVIRONMENTS WITH RADIO-FREQUENCY NOISE

CROSS-REFERENCE TO RELATED APPLICATION

The present application is a U.S. National Stage Application of International Application No. PCT/US2013/030939 filed Mar. 13, 2013, which is incorporated herein by reference in its entirety for all purposes.

BACKGROUND

The present disclosure relates generally to well drilling operations, formation evaluation, and, more particularly, to calibrating resistivity tools in environments with radio-frequency noise.

Well drilling and logging operations typically require formation resistivity measurements. These measurements may be captured using resistivity logging tools, such as array laterolog and induction tools, that may be deployed into a borehole via a variety of means. Typically, these tools must be calibrated to determine the tool response under a variety of signals. Unfortunately, calibrating the tools normally requires that they be away from metals and other interference, which can be difficult in many instances, but particularly on offshore drilling rigs. Transporting the tools off of the rig for calibration can be expensive and time-consuming.

FIGURES

Some specific exemplary embodiments of the disclosure may be understood by referring, in part, to the following description and the accompanying drawings.

Figure 3:
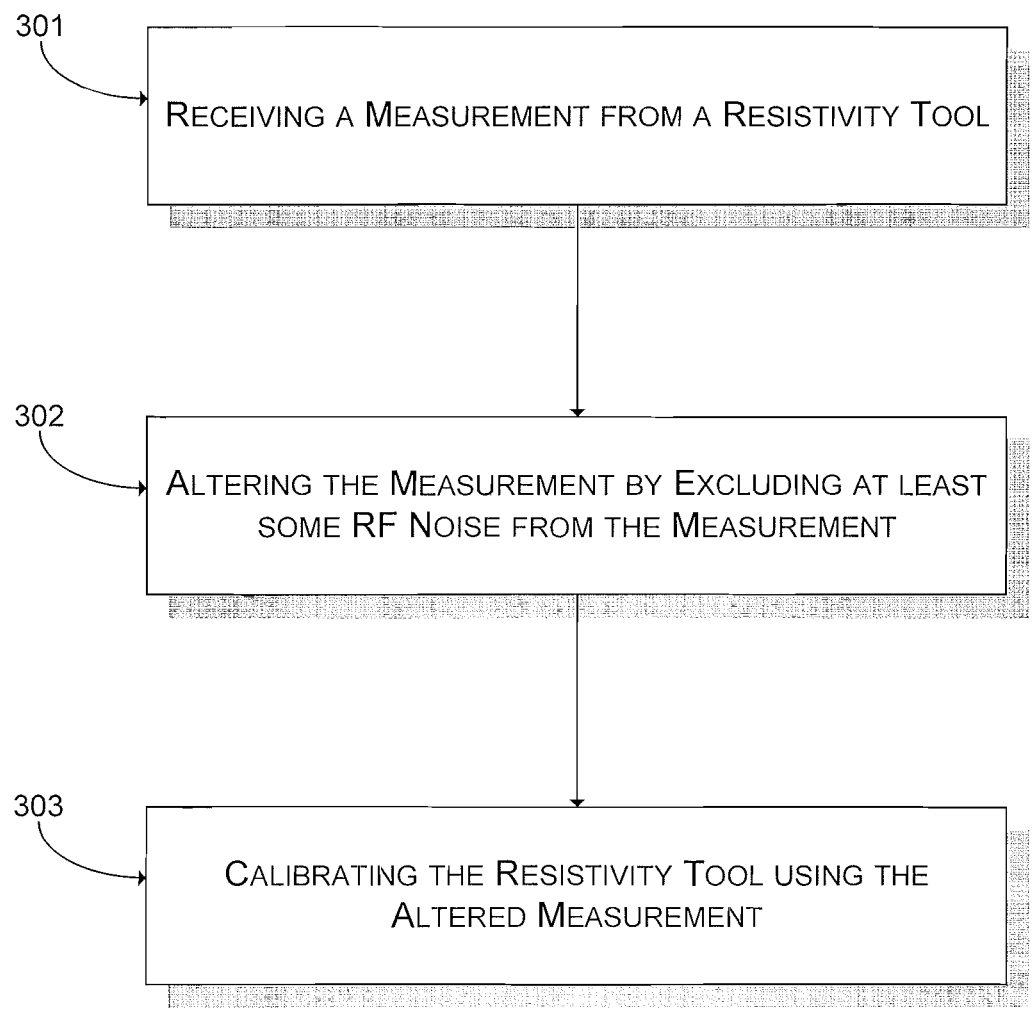
Figure 4:
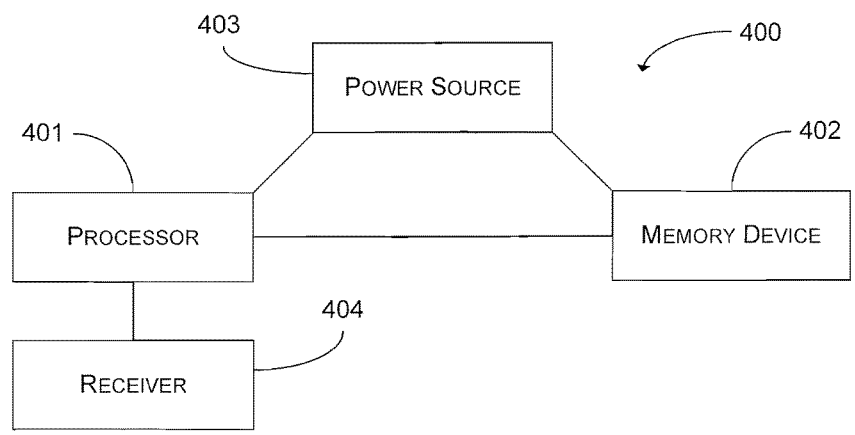
Figure 5:
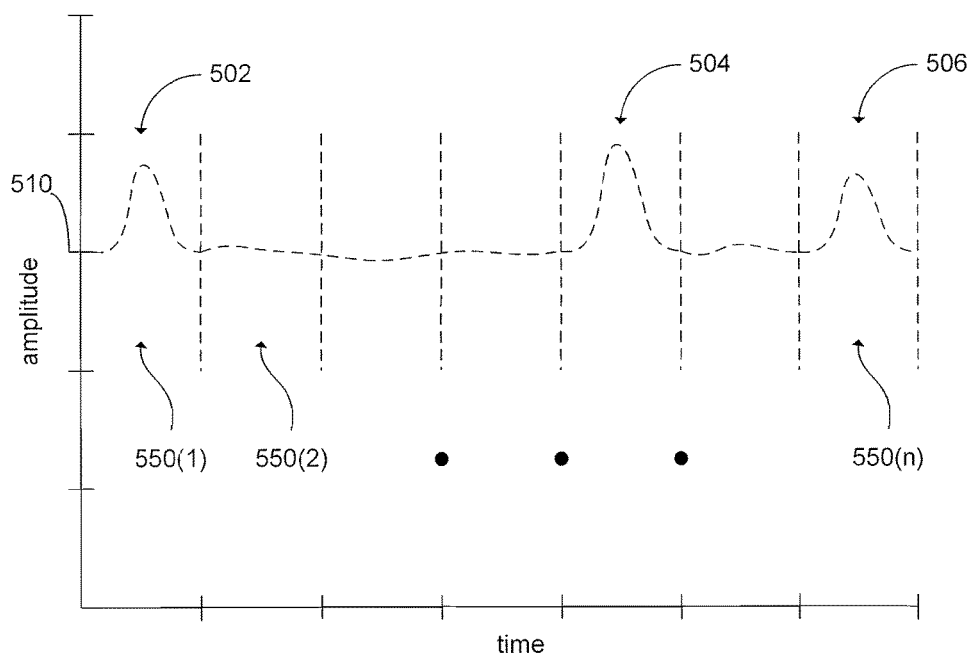

FIG. 3 illustrates an example method, according to aspects of the present disclosure FIG. 4 illustrates an example information handling system, according to aspects of the present disclosure FIG. 5 illustrates an example measurement, according to aspects of the present disclosure While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to calibrating resistivity tools in environments with radio-frequency noise.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

Figure 1:
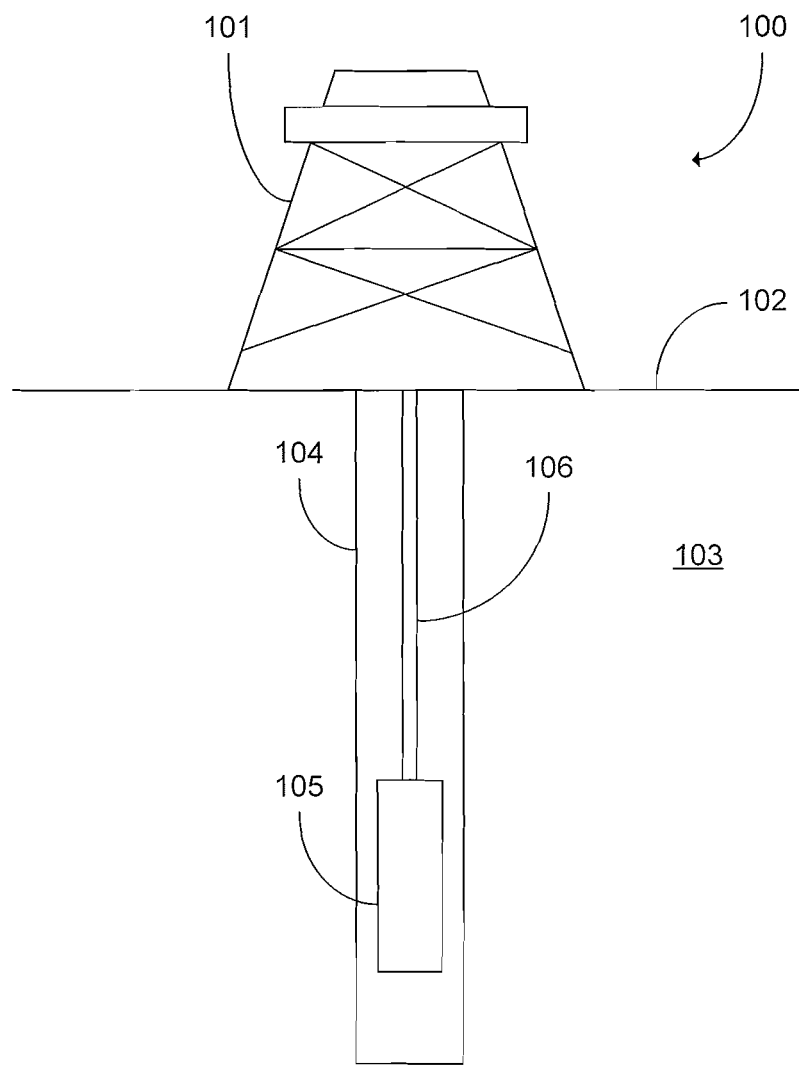
FIG. 1 illustrates an example logging system, according to aspects of the present disclosure.

FIG. 1 shows an example logging system 100, according to aspects of the present disclosure. The logging system 100 includes rig 101 mounted at the surface 102 and positioned above borehole 104 within a subterranean formation 103. In the embodiment shown, a resistivity tool 105 may be positioned within the borehole 104 and may be coupled to the rig 102 via wireline 106. The resistivity tool 105 may comprise an array laterolog or an induction type tool, as would be appreciated by one of ordinary skill in view of this disclosure. In other embodiments, the resistivity tool 105 may be incorporated into another, larger downhole tool, including a logging while drilling (LWD) or measurement while drilling (MWD) apparatus.

Figure 2A:
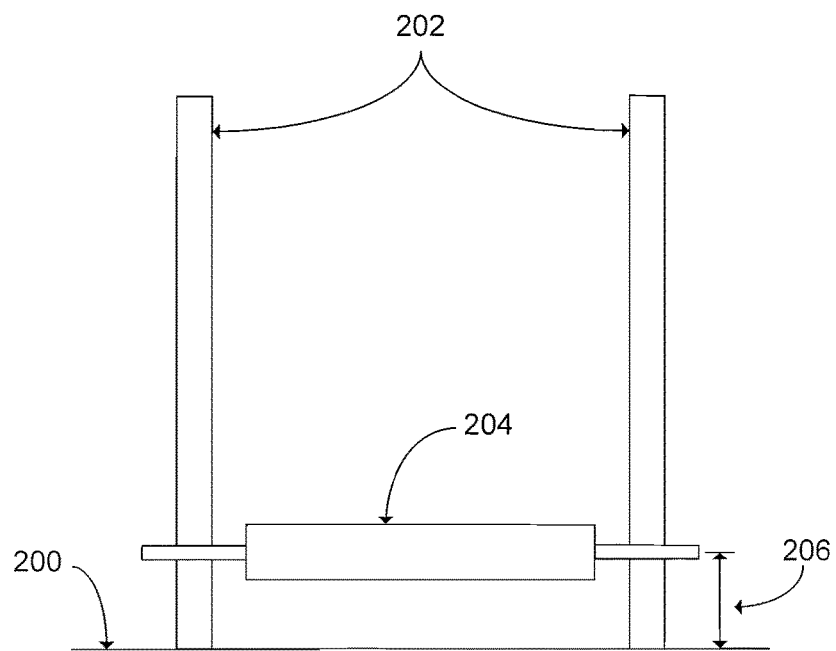
FIG. 2A illustrates an example calibration apparatus, according to aspects of the present disclosure.
Figure 2B:
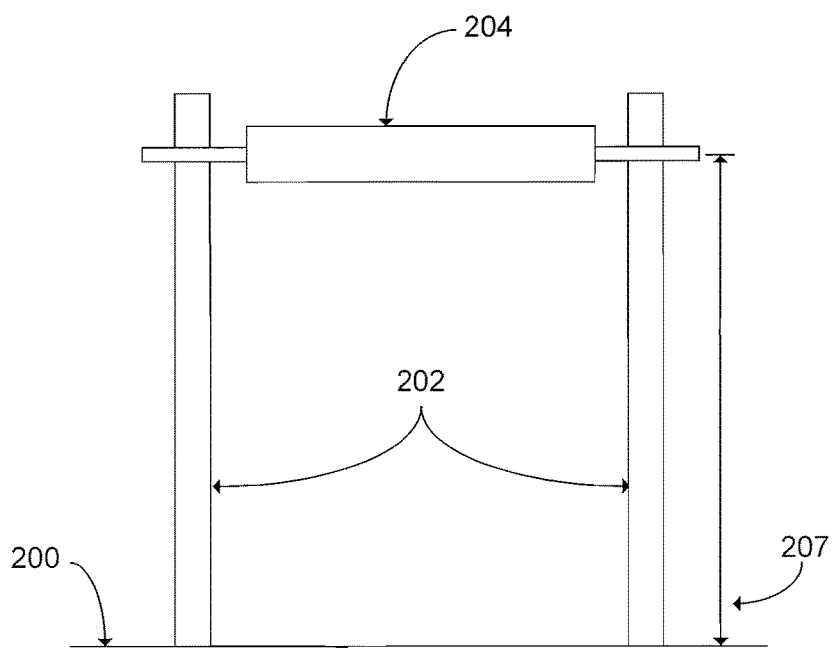
FIG. 2B illustrates an example calibration apparatus, according to aspects of the present disclosure.

Some resistivity tools, including those that are the same as or similar to resistivity tool 105, may be calibrated to increase the accuracy of the resistivity measurements and the subsequent formation characteristic values calculated using the resistivity measurements. FIGS. 2A and 2B illustrate an example calibration apparatus, according to aspects of the present disclosure. In FIG. 2A, a resistivity tool 204 may be coupled to calibration poles 202 that extend vertically from the ground 200. The resistivity tool 204 may be positioned at a first height 206 from the ground 200. In certain embodiments, first measurements may be taken with the resistivity tool 204 at the first height 206. The first measurements may be taken without a signal being applied and with a signal applied, to determine a signal gain at the tool. The first measurements may suffer from a ground effect due to the proximity of the resistivity tool 204 to the ground 200. The ground effect may skew the gain value and measurements received from the resistivity tool 204. This may be particularly problematic, for example, on offshore drilling rigs, which are typically made of metal that may affect the measurements more acutely.

In FIG. 2B, the resistivity tool 204 has been moved to a second height 207 on the calibration poles 202, with the second height 207 being higher than the first height 206 relative to the ground 200. Second measurements may be taken with the resistivity tool 204 at the second height 207. The second height 204 may be high enough to substantially avoid the ground effects. For deep reading resistivity tools, the second height 207 may be at least 20 feet above the ground 200. The second measurements may be used to correct for the ground effects in the first measurements. Depending on the location, however, radio frequency (RF) signals, such as AM radio frequencies, may interfere with the second measurements. For example, the resistivity tool 204 may comprise at least one wired coil to induce a current into a formation and at least one wired coil to receive the induced current. The RF signals may be received at the receiver coil and alter the amplitude of the second measurements. These RF radio signals may be higher in certain areas than others, and may significantly affect the accuracy of the resulting measurement.

According to aspects of the present disclosure, systems and methods for calibrating resistivity tools in environments with radio-frequency (RF) noise are described herein. The systems and methods may account for RF noise in the measurements from a resistivity tool, similar to those described in FIGS. 1, 2A, and 2B. The systems may include and the methods may be implemented on calibration apparatuses similar to those described above in FIGS. 2A and 2B. FIG. 3 illustrates an example method. Step 301 may comprise receiving a measurement from a resistivity tool. In certain embodiments, the first measurement may be received at an information handling system coupled to the resistivity tool, or at an information handling system incorporated within the resistivity tool. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal in communication with the resistivity tool, or may be incorporated as part of a control mechanism within the resistivity tool. The information handling system may include one or more memory devices and one or more processing resources, such as a central processing unit (CPU) or hardware or software control logic, coupled to the memory device. The memory device may contain a set on instructions that, when executed, cause the processor to perform predefined steps and computations, as will be described below.

One example information handling system 400 is shown in FIG. 4. As can be seen, the information handling system 400 comprises a processor 401 and a memory device 402 coupled to the processor 401. The processor 401 and memory device 402 may receive power from a power source 403, which may comprise a standard AC power source in the case where the information handling system 400 is a computer terminal, and may comprise a battery in the instances where the information handling system 400 is incorporated within the resistivity tool. The processor 401 may be coupled to at least one receiver 404 within a resistivity tool and may receive measurement from the at least one receiver 404. In certain other embodiments, the processor 401 may be coupled to at least one transmitter within a resistivity tool (not shown) and may cause the resistivity tool to emit a signal for the calibration processes. Additionally, the memory device 402 may contain a set of instructions that alter the signals and calibrate the resistivity tool, as will be described below.

Returning to FIG. 3, step 302 includes altering the measurement by excluding at least some RF noise from the measurement. In certain embodiments, altering the measurement by excluding at least some RF noise from the measurement may include dividing the measurement into a plurality of time intervals. FIG. 5 illustrates an example measurement that may correspond to the second measurement described above with respect to FIGS. 2A and 2B. As can be seen, the measurement may have a generally consistent amplitude 510, with the exception of spikes 502, 504, and 506. The spikes 502, 504, and 506 may correspond with RF noise spikes received at the resistivity tool when the resistivity tool is raised for calibration. The measurement 500 may be divided into time intervals or bins 550(1)-550(n). The time intervals generally may be equal in duration, but they are not required to be.

According to aspects of the present disclosure, altering the measurement by excluding at least some RF noise from the measurement may further include identifying the time intervals that contain RF noise spikes and excluding the time intervals that contain RF noise spikes and averaging the remaining time intervals. The time intervals that contain RF noise spikes 502, 504, and 506 may be identified in numerous ways. For example, the absolute maximum amplitude value for each of the time intervals 550(1)-550(n) may be identified. In certain other embodiments, the amplitude in each of the time intervals 550(1)-550(n) may be averaged, the averages may be compared, and the outlier averages may be excluded. Other methods for excluding the RF noise spikes will be appreciated by one of ordinary skill in view of this disclosure. Once the time intervals containing the RF noise spikes 502, 504, and 506 have been excluded, the amplitudes of the remaining time intervals may be averaged together to produce an altered measurement value.

In certain other embodiments, altering the measurement by excluding at least some RF noise from the measurement may further include selecting a most frequently occurring amplitude value within the plurality of time intervals as the second measurement. For example, the amplitudes in each of the time intervals 550(1)-550(n) may be averaged, and the averages may be sorted to determine the most frequently occurring. As will be appreciated by one of ordinary skill in the art in view of this disclosure, the average amplitudes for the time intervals may still have some variation. In such cases, the average amplitudes may be treated as the same if they vary by a statistically insignificant percentage. Once the most frequently occurring amplitude value is determined, it may be selected to be used as the altered measurement.

Again returning to FIG. 3, step 303 may include calibrating the resistivity tool using the altered measurement. In certain embodiments, the altered measurement may correspond to the resistivity tool being positioned at a first height, and calibrating the resistivity tool may comprise comparing the altered measurement to second measurements that correspond to the resistivity tool being positioned at a second height, lower than the first height. The second measurements may be skewed by the ground effect, and the altered measurements may be used to determine and account for the ground effect. For example, the second measurements may be average and compared to the altered measurements. Comparing the second measurements and the altered measurements may identify the ground effect so that future calibration measurements take by the resistivity tool may be corrected.

As stated above, the calibration method may be incorporated with a calibration apparatus similar to the one described in FIGS. 2A and 2B. One example method comprises positioning a resistivity tool at a first height and receiving a first measurement from a resistivity tool at the first height. The resistivity may be positioned at the first height using calibration poles, for example. The method may further include positioning the resistivity tool at a second height, higher than the first height, and receiving a second measurement from the resistivity tool at the second height. The second measurement may be altered by excluding at least some RF noise from the second measurement. Additionally, a ground effect on the first measurement may be determined using the altered second measurement.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces. Additionally, the terms "couple" or "coupled" or any common variation as used in the detailed description or claims are not intended to be limited to a direct coupling. Rather two elements may be coupled indirectly and still be considered coupled within the scope of the detailed description and claims.

What is claimed is:

1. A method for calibrating resistivity tools in environments with radio-frequency (RF) noise, comprising:
   receiving a first measurement from a resistivity tool positioned on at least one calibration pole, wherein the first measurement corresponds to the resistivity tool being positioned at a first height above ground;
   receiving a second measurement from the resistivity tool, wherein:
      the second measurement corresponds to the resistivity tool being positioned on the least one calibration pole at a second height above ground, and
      the second height is lower than the first height; and
   altering the first measurement by excluding at least some RF noise from the first measurement;
   determining a ground effect associated with the second measurement; and
   calibrating the resistivity tool using the altered first measurement.

2. The method of claim 1, wherein altering the first measurement by excluding at least some RF noise from the first measurement comprises dividing the first measurement into a plurality of time intervals.

3. The method of claim 2, wherein altering the first measurement by excluding at least some RF noise from the first measurement further comprises:
   identifying at least one time interval that contains an RF noise spike;
   excluding the at least one time interval; and
   averaging the remaining time intervals.

4. The method of claim 2, wherein altering the first measurement by excluding at least some RF noise from the first measurement further comprises selecting a most frequently occurring amplitude value within the plurality of time intervals.

5. The method of claim 1, wherein calibrating the resistivity tool using the altered first measurement comprises comparing the altered first measurement to the second measurement to determine the ground effect on the second measurement.

6. A system for calibrating resistivity tools in environments with radio-frequency (RF) noise, comprising:
   a processor;
   a memory device in communication with the processor, wherein the memory device comprises a set of instruction that, when executed by the processor, causes the processor to
      receive a first measurement from a resistivity tool positioned on at least one calibration pole, wherein the first measurement corresponds to the resistivity tool being positioned at a first height above ground;
      receive a second measurement from the resistivity tool, wherein:
         the second measurement corresponds to the resistivity tool being positioned on the least one calibration pole at a second height above ground; and
         the second height is lower than the first height; and
      alter the first measurement by excluding at least some RF noise from the first measurement;
      determine a ground effect associated with the second measurement; and
      calibrate the resistivity tool using the altered first measurement.

7. The system of claim 6, wherein the instructions that, when executed by the processor, cause the processor to alter the first measurement by excluding at least some RF noise from the first measurement, further cause the processor to divide the first measurement into a plurality of time intervals.

8. The system of claim 7, wherein the instructions that, when executed by the processor, cause the processor to alter the first measurement by excluding at least some RF noise from the first measurement, further cause the processor to:
   identify at least one time interval that contains an RF noise spike;
   exclude the at least one time interval; and
   average the remaining time intervals.

9. The system of claim 7, wherein the instructions that, when executed by the processor, cause the processor to alter the first measurement by excluding at least some RF noise from the first measurement, further cause the processor to select a most frequently occurring amplitude value within the plurality of time intervals.

10. The system of claim 6, wherein the instructions that, when executed by the processor, cause the processor to calibrate the resistivity tool using the altered first measurement, further cause the processor to compare the altered first measurement to the second measurement to determine the effect on the second measurement.

11. A method for calibrating resistivity tools in environments with radio-frequency (RF) noise, comprising:
   receiving a first measurement from a resistivity tool positioned on at least one calibration pole, wherein the first measurement is taken with the resistivity tool at a first height above ground;
   receiving a second measurement from the resistivity tool, wherein:
      the second measurement is taken with the resistivity tool positioned on the at least one calibration pole at a second height above ground; and
      the second height is greater than the first height;
   altering the second measurement by excluding at least some RF noise from the second measurement; and determining a ground effect on the first measurement using the altered second measurement.

12. The method of claim 11, wherein altering the second measurement comprises dividing the second measurement into a plurality of time intervals.

13. The method of claim 12, wherein altering the second measurement further comprises:
   identifying at least one time interval that contains an RF noise spike;
   excluding the at least one time interval; and
   averaging the remaining time intervals.

14. The method of claim 12, wherein altering the second measurement further comprises selecting a most frequently occurring amplitude value within the plurality of time intervals as the altered second measurement.

15. The method of claim 11, further comprising:
   positioning the resistivity tool at the first height using a pair of calibration poles; and
   positioning the resistivity tool at the second height using the pair of calibration poles.

16. The method of claim 11, wherein determining the ground effect on the first measurement using the altered second measurement comprises comparing the altered second measurement to the first measurement.

* * * * *